(12) United States Patent
Julian et al.

(10) Patent No.: US 8,661,322 B2
(45) Date of Patent: Feb. 25, 2014

(54) APPARATUS AND METHOD FOR SELECTIVE RESPONSE TO INCREMENTAL REDUNDANCY TRANSMISSIONS

(75) Inventors: David Jonathan Julian, San Diego, CA (US); Avneesh Agrawal, San Diego, CA (US); Edward Harrison Teague, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 2182 days.

(21) Appl. No.: 11/020,583

(22) Filed: Dec. 22, 2004

(65) Prior Publication Data

US 2006/0136790 A1 Jun. 22, 2006

(51) Int. Cl.
H03M 13/00 (2006.01)
(52) U.S. Cl.
USPC .......................................................... 714/774
(58) Field of Classification Search
USPC .......................................................... 714/774
See application file for complete search history.

(56) References Cited

U.S. PATENT DOCUMENTS

| | | | | | |
|---|---|---|---|---|---|
| 5,828,677 | A | * | 10/1998 | Sayeed et al. | 714/774 |
| 5,903,554 | A | * | 5/1999 | Saints | 370/342 |
| 6,021,124 | A | * | 2/2000 | Haartsen | 370/336 |
| 6,138,260 | A | * | 10/2000 | Ketseoglou | 714/751 |
| 6,675,346 | B2 | * | 1/2004 | Tsunoda | 714/774 |
| 6,859,456 | B1 | * | 2/2005 | Hetherington et al. | 370/394 |
| 7,024,611 | B2 | * | 4/2006 | Chen et al. | 714/751 |
| 7,085,239 | B2 | | 8/2006 | Ling et al. | |
| 7,200,789 | B2 | * | 4/2007 | Kim et al. | 714/748 |
| 2002/0046379 | A1 | | 4/2002 | Miki et al. | |
| 2010/0135156 | A1 | * | 6/2010 | Sarkar | 370/230 |

FOREIGN PATENT DOCUMENTS

| | | |
|---|---|---|
| EP | 1 255 368 A1 | 4/2001 |
| EP | 1 526 673 A1 | 7/2003 |
| EP | 1 533 931 | 5/2005 |
| JP | 11177536 A | 7/1999 |
| JP | 2001145164 A | 5/2001 |
| JP | 2002009741 A | 1/2002 |
| JP | 2002009883 A | 1/2002 |

(Continued)

OTHER PUBLICATIONS

Qui et al, "Performance Enhancement of Incremental Redundancy in Wireless Data Networks by Measurement-based Transmission Control", Vehicular Technology Conference. 1999. VTC 1999-Fall. IEEE VTS 50th Amsterdam, Netherlands Sep. 19-22, 1999, Piscataway, NJ, USA, IEEE, US, vol. 1, (Sep. 19, 1999), pp. 517-522, XP010352851 ISBN: 0-7803-5435-4 abstract I. Introduction, II. Incremental redundancy with mode 0.

(Continued)

Primary Examiner — Albert Decady
Assistant Examiner — Enam Ahmed
(74) Attorney, Agent, or Firm — Donald C. Kordich

(57) ABSTRACT

Method and apparatus for transmission of information in multiple access communication system is claim. Information using incremental redundancy is transmitted. A determination is made as to whether reverse link performance drops below a predetermined threshold. Determination of reverse link performance may be done in variety of ways, including use of a filter percentage of ACK erasures, measured error rates on the reverse link control channel, reverse link data channel error rates, and other methods. Upon determination of channel degradation, the access point can decide whether to ignore messages sent from the access terminal to instruct the access terminal to cease transmission.

55 Claims, 7 Drawing Sheets

(56) References Cited

FOREIGN PATENT DOCUMENTS

| | | |
|---|---|---|
| JP | 2004064691 | 2/2004 |
| JP | 2004080165 A | 3/2004 |
| KR | 200305897 | 1/2003 |
| WO | WO 03/055122 A1 | 7/2003 |
| WO | WO 03/096150 A2 | 11/2003 |
| WO | 04014014 | 2/2004 |
| WO | 2004017555 | 2/2004 |
| WO | WO 2004/075023 A2 | 9/2004 |
| WO | 2004102980 A2 | 11/2004 |
| WO | WO 2005/071887 A1 | 8/2005 |

OTHER PUBLICATIONS

International Search Report and Written Opinion—PCT/US2005/046803, International Search Authority—European Patent Office—Jun. 21, 2006.

Taiwan Search Report—TW094145917—TIPO—Mar. 7, 2012.

* cited by examiner

APPARATUS AND METHOD FOR SELECTIVE RESPONSE TO INCREMENTAL REDUNDANCY TRANSMISSIONS

BACKGROUND

I. Field

The invention relates generally to the field of wireless communications, and more particularly to a method, apparatus, and system for selectively responding to incremental redundancy transmissions in multiple access communication systems.

II. Background

In recent years, communication systems' performance and capabilities have continued to improve rapidly in light of several technological advances and improvements with respect to telecommunication network architecture, signal processing, and protocols. In the area of wireless communications, various multiple access standards and protocols have been developed to increase system capacity and accommodate fast-growing user demand. These various multiple access schemes and standards include Time Division Multiple Access (TDMA), Frequency Division Multiple Access (FDMA), Code Division Multiple Access (CDMA), and Orthogonal Frequency Division Multiple Access (OFDMA), etc. Generally, in a system which employs TDMA technique, each user is allowed to transmit information in his assigned or allocated time slots whereas an FDMA system allows each user to transmit information on a particular frequency that is assigned to that particular user. A CDMA system, in contrast, is a spread spectrum system which allows different users to transmit information at the same frequency and at the same time by assigning a unique code to each user. In an OFDMA system, a high-rate data stream is split or divided into a number of lower rate data streams which are transmitted simultaneously in parallel over a number of subcarriers (also called subcarrier frequencies herein). Each user in an OFDMA system is provided with a subset of the available subcarriers for transmission of information. The subset of carriers provided to each user in an OFDMA system can be fixed or vary, for example, in the case of Frequency-Hopping OFMDA (FH-OFDMA). Multiple access techniques in TDMA, FDMA, and CDMA are illustrated in FIG. 1. As shown in FIG. 1, the communication channels in FDMA are separated by frequencies in which a particular channel corresponds to a particular frequency. In a TDMA system, the communication channels are separated by time in which a particular channel corresponds to a particular time slot. In contrast, communication channels in a CDMA system are separated by codes in which a particular channel corresponds to a particular code.

In wireless systems, it is usually inefficient to guarantee a reliable packet transfer on every single transmission. The inefficiency is particularly pronounced in systems where underlying channel conditions vary drastically from transmission to transmission. For example, in an FH-OFDMA system, there is a wide variation in the received signal-to-noise ratio (SNR) between frames/packets, thus making it difficult and inefficient to guarantee a small frame error rate (FER) for each packet transmission. Such difficulty and inefficiency also apply to other communication systems which employ orthogonal multiple access techniques including, but are not limited to, TDMA, FDMA, and orthogonal CDMA, etc.

In such communication systems, a packet retransmission mechanism such as the Automatic Retransmission/Repeat Request (ARQ) scheme may be used to help lessen such inefficiency. However, this is done at the expense of higher packet latency since it takes longer on average for each packet to get through. In general, large packet latency may not be a significant problem for data traffic but could be detrimental to voice traffic or other types of applications that require low latency in transmission of information. Moreover, packet transmission latency is expected to increase as the number of users in the system continues to grow. Thus, to improve system capacity (e.g., based on system throughput or number of users that simultaneously use the system, etc.), transmission latency should be kept low or small.

The efficiency of early termination in ARQ schemes is based on the reliability of acknowledge (ACK) and not-acknowledge (NACK) transmissions. If the error rates of NACKs sent that are interpreted as ACKs becomes too great, then many packet transmissions will be incorrectly terminated prior to success. Further, access terminals may needlessly be sending ACK/NACK messages, thereby causing interference in the system.

Accordingly, there exists a need for a method, apparatus, and system for reducing overhead in responding to ACK/NACK messages in multiple access systems that employ packet retransmission mechanisms such as ARQ.

SUMMARY

Accordingly, the embodiments discussed herein provide for mechanisms to minimize situations in which the access point can become out of synchronization with the access terminal According to one aspect, information using incremental redundancy is transmitted. A determination is made as to whether reverse link performance drops below a predetermined threshold. Determination of reverse link performance may be done in variety of ways, including use of a filtered percentage of ACK erasures, measured error rates on the reverse link control channel, reverse link data channel error rates, and other methods. Upon determination of channel degradation, the access point can decide whether to ignore messages sent from the access terminal and to instruct the access terminal to cease transmission. By ignoring messages, the access point transitions to a non-incremental redundancy mode. This allows for a graceful transition for access terminals experiencing poor reverse-link quality. By signaling the access terminal to stop sending ACK/NACK messages, interference caused by the ACK/NACK bit transmission is eliminated.

In another aspect, methods, systems, and apparatuses to determine whether a transmission channel has degraded are described. Data indicative of an acknowledgment (ACK) or indicative of a not-acknowledgment (NACK) is received. The quality of the data received is measured. A determination is made as to whether the channel has degraded as a function of the quality measurement of the data received. This determination may be accomplished by considering the filtered percentage of erasures over a predetermined amount of time. If it is determined that the data received is reliably a NACK, a rapid retransmission of data may be sent.

BRIEF DESCRIPTION OF THE DRAWINGS

Various aspects and features of the present invention are disclosed by the following detailed description and references to the accompanying drawings, in which.

DETAILED DESCRIPTION

In the following detailed description numerous specific details are set forth. However, it is understood that various embodiments of the invention may be practiced without these specific details. It should be appreciated and understood by one skilled in the art that the various embodiments of the invention described below are exemplary and are intended to be illustrative of the invention rather than limiting.

As described herein, according to one embodiment of the invention, a method is provided to allow efficient user-multiplexing in a multiple access system which employs an incremental redundancy transmission scheme, such as the Automatic Repeat/Retransmission (ARQ) scheme. In the examples that are provided below, while ARQ systems are discussed for the purposes of explanation and illustration, it should be understood and appreciated by one skilled in the art that the teachings of the present invention are not limited to multiple access system with ARQ transmission schemes, but are also equally applicable to other multiple access systems which employ different numbers of interlaces for the purposes of providing redundancy.

The techniques described herein may be used for various communication systems such as an Orthogonal Frequency Division Multiple Access (OFDMA) system, a Code Division Multiple Access (CDMA) system, a Time Division Multiple Access (TDMA) system, a Frequency Division Multiple Access (FDMA) system, an orthogonal frequency division multiplexing (OFDM)-based system, a single-input single-output (SISO) system, a multiple-input multiple-output (MIMO) system, and so on. These techniques may be used for systems that utilize incremental redundancy (IR) and systems that do not utilize IR (e.g., systems that simply repeats data).

Figure 7:
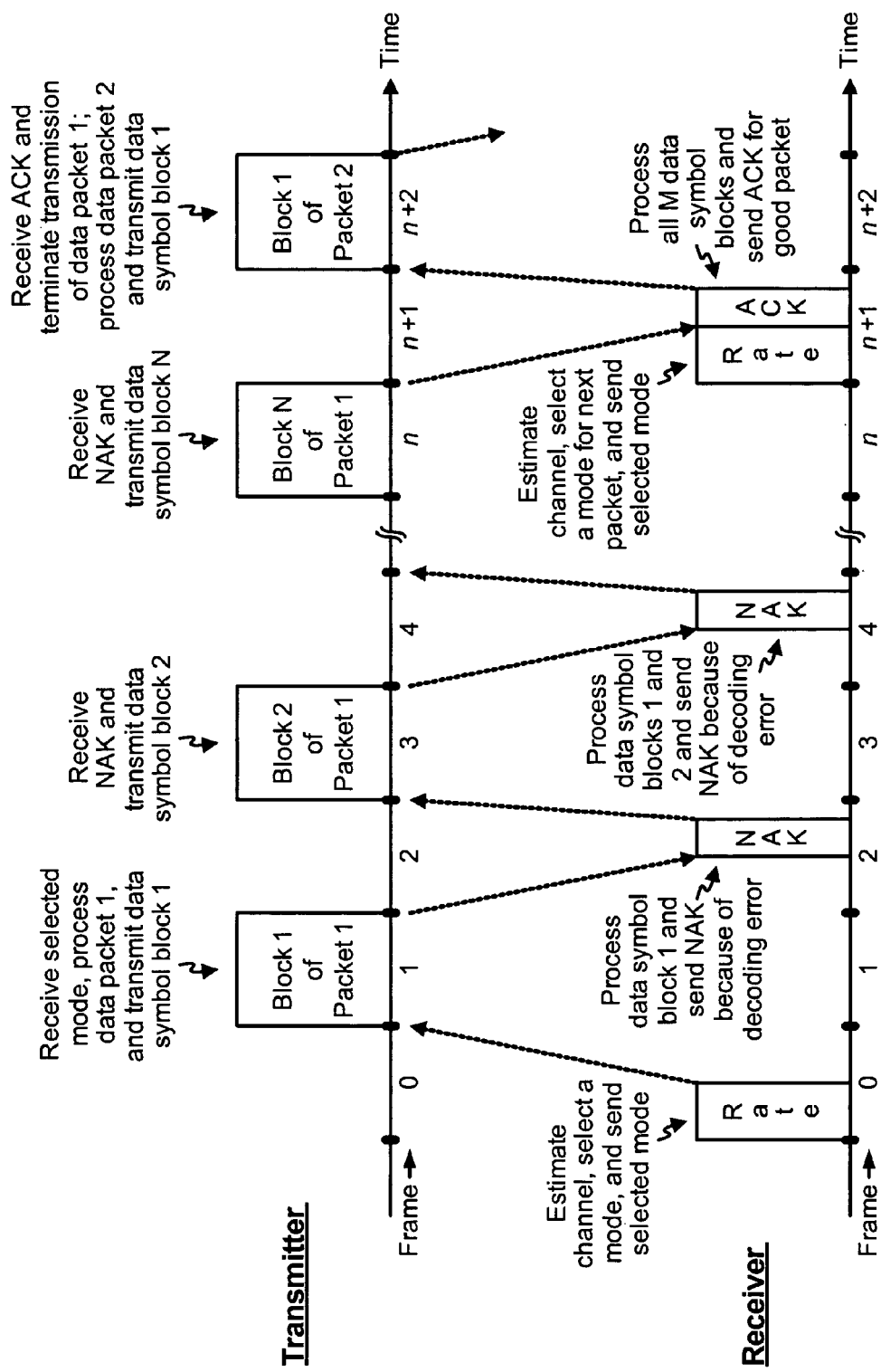
FIG. 7 illustrates an incremental redundancy transmission.

FIG. 7 illustrates an incremental redundancy transmission between a transmitter and a receiver in a communication system. The timeline for data transmission is partitioned into frames, with each frame having a particular time duration. For the incremental redundancy transmission embodiment shown in FIG. 7, the receiver initially estimates the communication channel, selects a "mode" based on the channel condition, and sends the selected mode to the transmitter in frame 0. Alternatively, the receiver sends back an estimate of the channel quality, and the transmitter selects the mode based on the channel quality estimate. In any case, the mode may indicate the packet size, the code rate, the modulation scheme, and so on, for the packet. The transmitter processes a data packet (Packet 1) in accordance with the selected mode, and generates up to T blocks of data symbols for the packet. T is the maximum number of blocks for a given data packet and is greater than one (T>1) for incremental redundancy. The first block typically contains sufficient information to allow the receiver to decode the packet under good channel condition.

Each subsequent block typically contains additional parity/redundancy information not contained in prior blocks. The transmitter then transmits the first data symbol block (Block 1) for Packet 1 in frame 1. The receiver receives, detects, and decodes the first data symbol block, determines that Packet 1 is decoded in error (i.e., "erased"), and sends back a negative acknowledgment (NAK) in frame 2. The transmitter receives the NAK and transmits the second data symbol block (Block 2) for Packet 1 in frame 3. The receiver receives and detects Block 2, decodes Blocks 1 and 2, determines that Packet 1 is still decoded in error, and sends back another NAK in frame 4. The block transmission and NAK response may repeat any number of times.

For the example shown in FIG. 7, the transmitter receives a NAK for data symbol block N−1 and transmits data symbol block N (Block N) for Packet 1 in frame n, where N≤T. The receiver receives and detects Block N, decodes Blocks 1 through N, determines that the packet is decoded correctly, and sends back an acknowledgment (ACK) in frame n+1. The receiver also estimates the communication channel, selects a mode for the next data packet, and sends the selected mode to the transmitter in frame n+1. The transmitter receives the ACK for Block N and terminates the transmission of Packet 1. The transmitter also processes the next data packet (Packet 2) in accordance with the selected mode, and transmits the first data symbol block (Block 1) for Packet 2 in frame n+2. The processing at the transmitter and receiver continues in the same manner for each data packet transmitted via the communication channel.

As shown in FIG. 7, with incremental redundancy, the transmitter sends each data packet in a series of block transmissions, with each block transmission carrying a portion of the packet. The receiver may attempt to decode the packet after each block transmission based on all blocks received for the packet. The transmitter terminates the transmission of the packet after receiving an ACK indicating successful decoding by the receiver.

For the example shown in FIG. 7, there is a delay of one frame for the ACK/NAK response from the receiver for each block transmission. In general, this delay may be one or multiple frames. To improve channel utilization, multiple data packets may be transmitted in an interlaced manner. For example, data packets for one traffic channel may be transmitted in odd-numbered frames and data packets for another traffic channel may be transmitted in even-numbered frames. More than two traffic channels may also be interlaced, e.g., if the ACK/NAK delay is longer than one frame.

The system may be designed to support a set of modes, which may also be called rates, packet formats, radio configurations, or some other terminology. Each mode may be associated with a particular code rate or coding scheme, a particular modulation scheme, a particular spectral efficiency, and a particular minimum signal-to-noise-and-interference ratio (SINR) required to achieve a target level of performance, e.g., 1% packet error rate (PER). Spectral efficiency refers to the data rate (or the information bit rate) normalized by the system bandwidth, and is given in units of bits per second per Hertz (bps/Hz). In general, higher SINRs are needed for higher spectral efficiencies. The set of supported modes covers a range of spectral efficiencies, typically in increments that are somewhat evenly spaced. For a given channel condition and received SINR, the mode with the highest spectral efficiency supported by that received SINR may be selected and used for data transmission.

Spectral efficiency is determined by the code rate and modulation scheme. The code rate is the ratio of the number of input bits into an encoder to the number of code bits generated by the encoder and transmitted. For example, a code rate of 2/9 (or R=2/9) generates nine code bits for every two input bits. A lower code rate (e.g., R=1/4 or 1/5) has more redundancy and thus greater error correction capability. However, more code bits are transmitted for a lower code rate, and spectral efficiency is thus also lower.

Various modulation schemes may be used for data transmission. Each modulation scheme is associated with a signal constellation that contains M signal points, where M>1. Each signal point is defined by a complex value and is identified by a B-bit binary value, where B≥1 and $2^B$=M. For symbol mapping, the code bits to be transmitted are first grouped into sets of B code bits. Each set of B code bits forms a B-bit binary value that is mapped to a specific signal point, which is then transmitted as a modulation symbol for that group of B code bits. Each modulation symbol thus carries information for B code bits. Some commonly used modulation schemes include Binary Phase Shift Keying (BPSK), Quadrature Phase Shift Keying (QPSK), M-ary Phase Shift Keying (M-PSK), and M-ary Quadrature Amplitude Modulation (M-QAM). The number of code bits per modulation symbol (B) can be given as: B=1 for BPSK, B=2 for QPSK, B=3 for 8-PSK, B=4 for 16-QAM, B=6 for 64-QAM, and so on. B is indicative of the order of a modulation scheme, and more code bits may be sent per modulation symbol for higher order modulation schemes.

Figure 8:
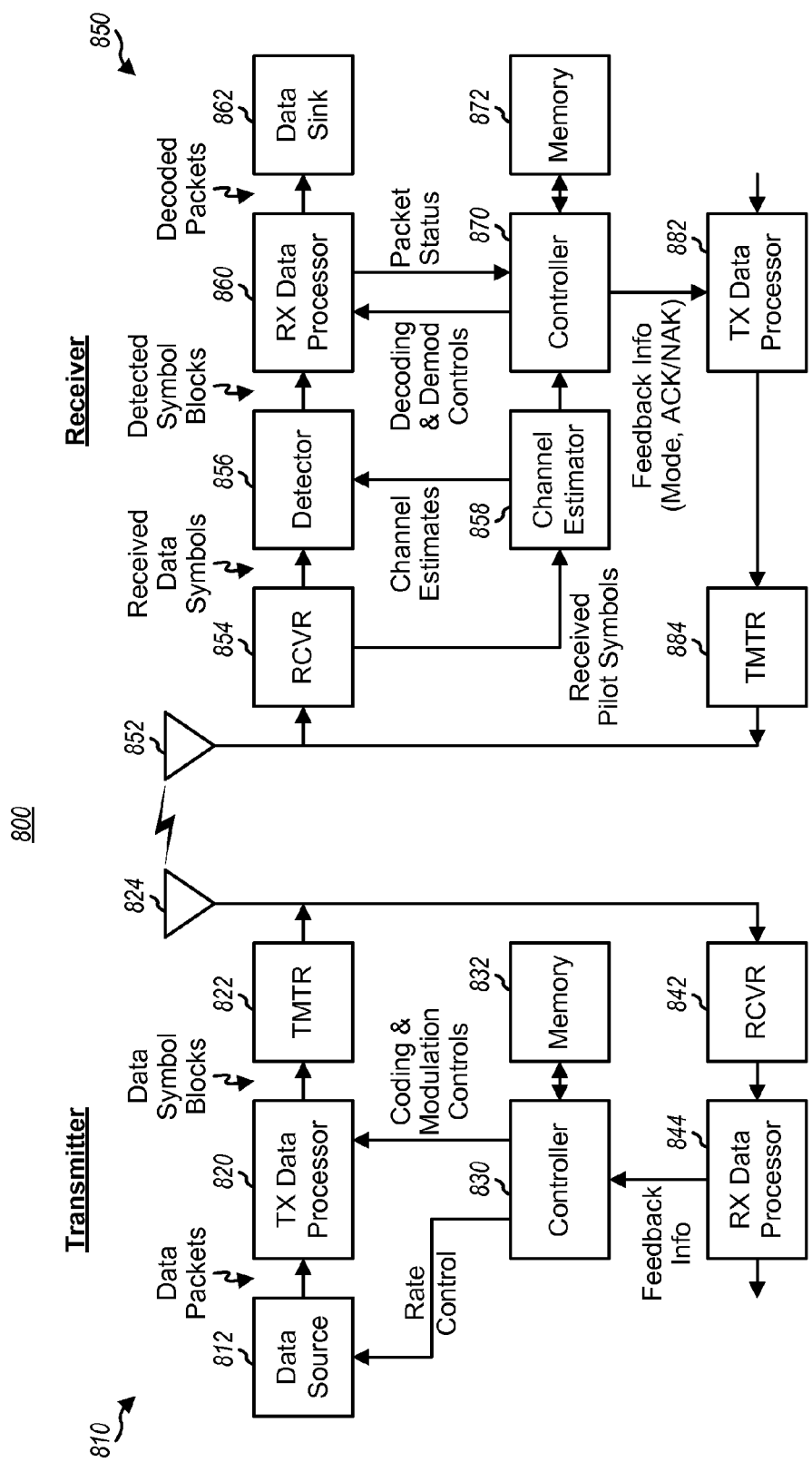
FIG. 8 illustrates a block diagram of a transmitter and a receiver.

FIG. 8 shows a block diagram of a transmitter 810 and a receiver 850 in a wireless communication system 800 that utilizes IR transmission. At transmitter 810, a TX data processor 820 receives data packets from a data source 812. TX data processor 820 processes (e.g., formats, encodes, partitions, interleaves, and modulates) each data packet in accordance with a mode selected for that packet and generates up to T blocks of data symbols for the packet. The selected mode for each data packet may indicate (1) the packet size (i.e., the number of information bits for the packet) and (2) the particular combination of code rate and modulation scheme to use for each data symbol block of that packet. A controller 830 provides various controls to data source 812 and TX data processor 820 for each data packet based on the selected mode as well as the feedback (ACK/NAK) received for the packet, if desired. This process is discussed further with respect to FIG. 3. TX data processor 820 provides a stream of data symbol blocks (e.g., one block for each frame), where the blocks for each packet may be interlaced with the blocks for one or more other packets.

A transmitter unit (TMTR) 822 receives the stream of data symbol blocks from TX data processor 820 and generates a modulated signal. Transmitter unit 822 multiplexes in pilot symbols with the data symbols (e.g., using time, frequency, and/or code division multiplexing) and obtains a stream of transmit symbols. Each transmit symbol may be a data symbol, a pilot symbol, or a null symbol having a signal value of zero. Transmitter unit 822 may perform a form of OFDM modulation if OFDM is used by the system. For example, an OFDMA system employing OFDM schemes may be used. Transmitter unit 822 generates a stream of time-domain samples and further conditions (e.g., converts to analog, frequency upconverts, filters, and amplifies) the sample stream to generate the modulated signal. The modulated signal is then transmitted from an antenna 824 and via a communication channel to receiver 850.

At receiver 850, the transmitted signal is received by an antenna 852, and the received signal is provided to a receiver unit (RCVR) 854. Receiver unit 854 conditions, digitizes, and pre-processes (e.g., OFDM demodulates) the received signal to obtain received data symbols and received pilot symbols. Receiver unit 854 provides the received data symbols to a detector 856 and the received pilot symbols to a channel estimator 858. Channel estimator 858 processes the received pilot symbols and provides channel estimates (e.g., channel gain estimates and SINR estimates) for the communication channel. Detector 856 performs detection on the received data symbols with the channel estimates and provides detected data symbols to an RX data processor 860. The detected data symbols may be represented by log-likelihood ratios (LLRs) for the code bits used to form the data symbols (as described below) or by other representations. Whenever a new block of detected data symbols is obtained for a given data packet, RX data processor 860 processes (e.g., deinterleaves and decodes) all detected data symbols obtained for that packet and provides a decoded packet to a data sink 862. RX data processor 860 also checks the decoded packet and provides the packet status, which indicates whether the packet is decoded correctly or in error.

A controller 870 receives the channel estimates from channel estimator 858 and the packet status from RX data processor 860. Controller 870 selects a mode for the next data packet to be transmitted to receiver 850 based on the channel estimates. Controller 870 also assembles feedback information, which may include the selected mode for the next packet, an ACK or a NAK for the packet just decoded, and so on. The feedback information is processed by a TX data processor 882, further conditioned by a transmitter unit 884, and transmitted via antenna 852 to transmitter 810.

At transmitter 810, the transmitted signal from receiver 850 is received by antenna 824, conditioned by a receiver unit 842, and further processed by an RX data processor 844 to recover the feedback information sent by receiver 850. Controller 830 obtains the received feedback information, uses the ACK/NAK to control the IR transmission of the packet being sent to receiver 850, and uses the selected mode to process the next data packet to send to receiver 850.

Controllers 830 and 870 direct the operation at transmitter 810 and receiver 850, respectively. Memory units 832 and 872 provide storage for program codes and data used by controllers 830 and 870, respectively.

Figure 1:
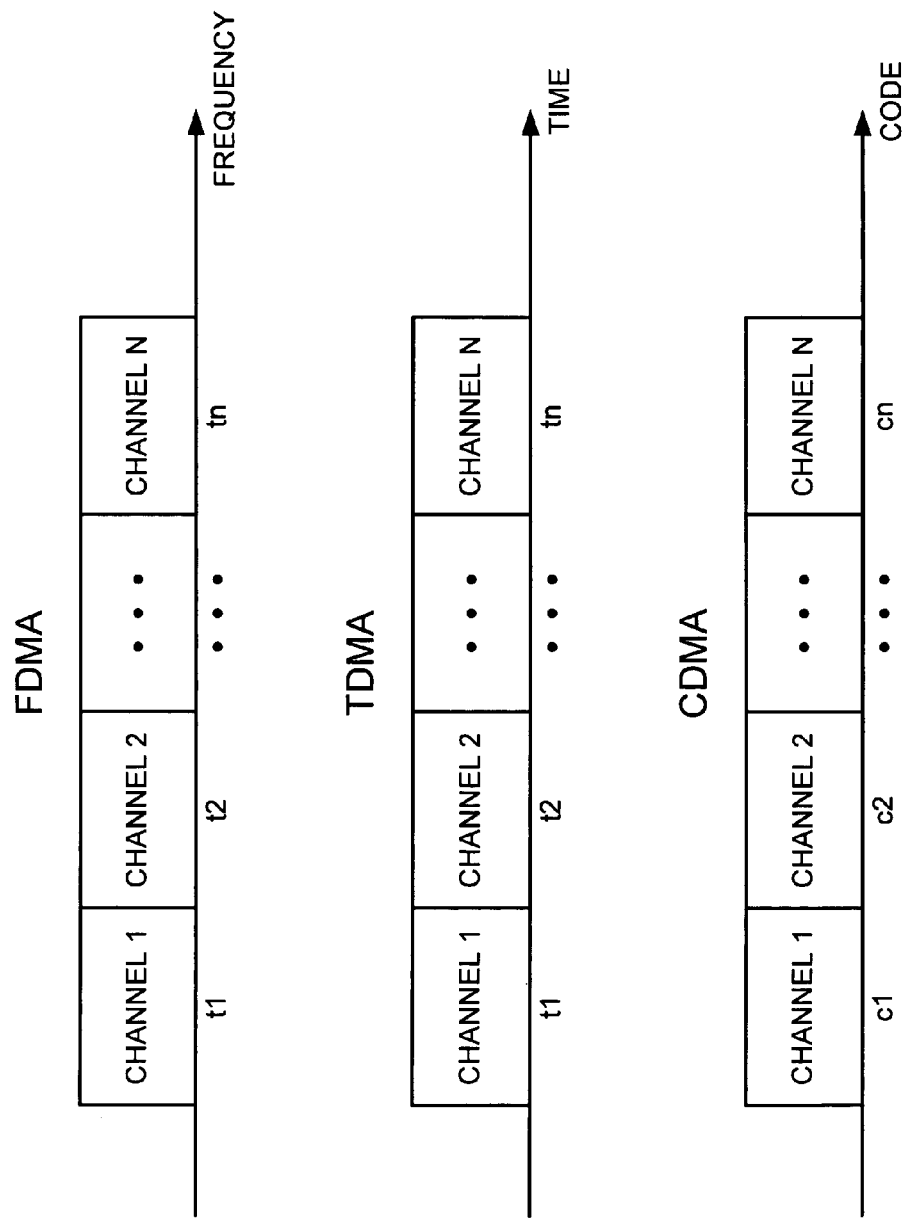
FIG. 1 is a diagram illustrating various channelization schemes in various multiple access systems.
Figure 2:
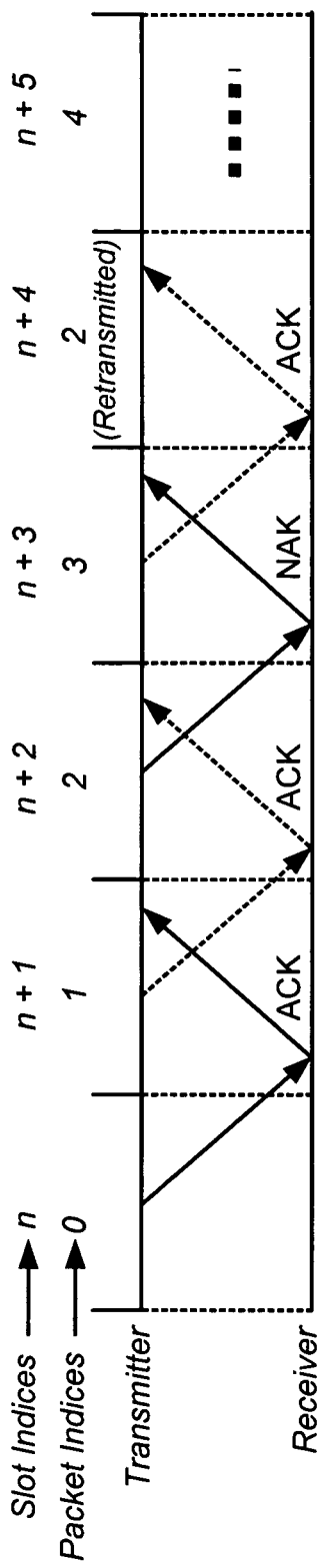
FIG. 2 is a diagram illustrating packet transmissions with two interlacing packet streams in a dual-channel ARQ system.
Figure 3:
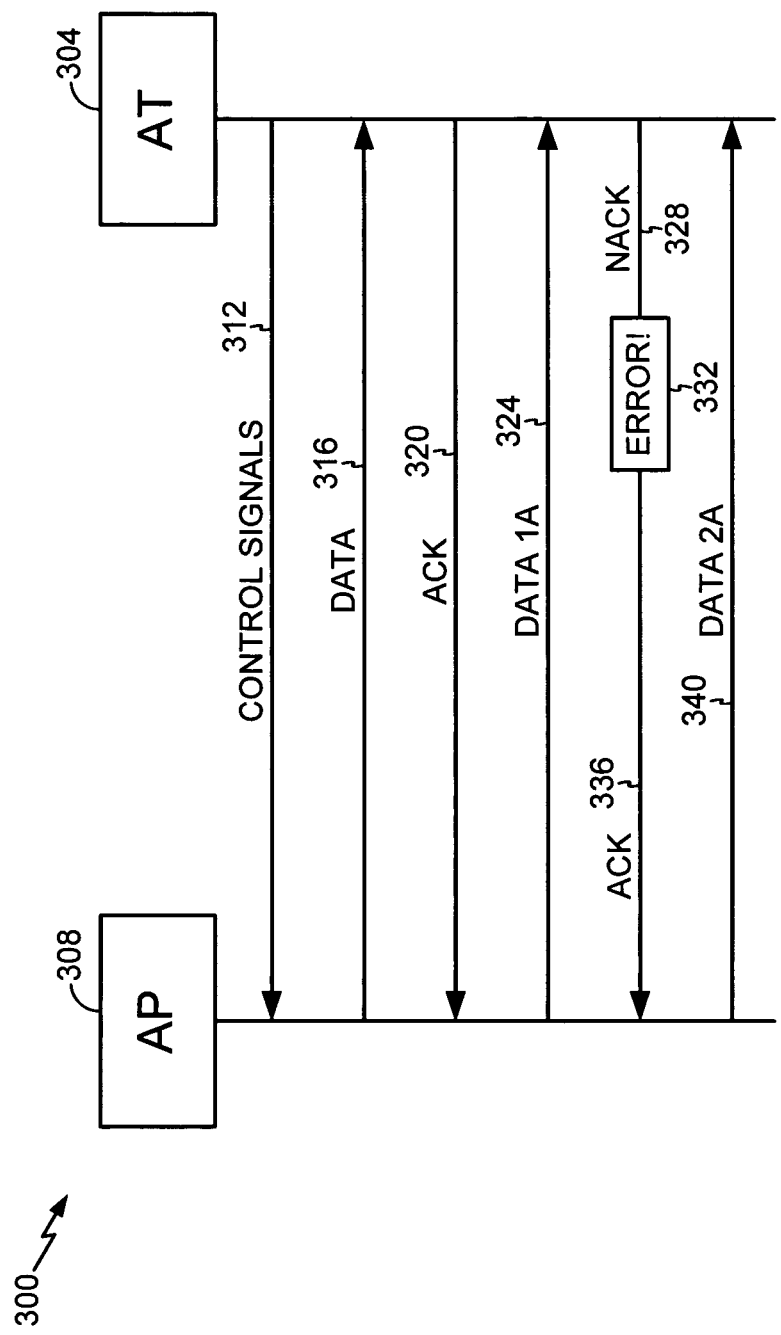
FIG. 3 illustrates a call process in which a NACK-to-ACK error occurs.

FIG. 3 illustrates a call process 300 in which a NACK-to-ACK error occurs. Specifically, FIG. 3 illustrates signals sent between access terminal (AT) 304 and access point (AP) 308. A call is established and various control signals are sent 312 from the access terminal 304 to the access point 308. These control signals include CQI, which is an indication of forward link channel quality, a REQUEST CHANNEL which indicates the initial request of a channel, and an ACK/NACK bit, which is an indication as to whether a transmission was properly received or not received.

An "access terminal" refers to a device providing voice and/or data connectivity to a user. An access terminal may be connected to a computing device such as a laptop computer or desktop computer, or it may be a self contained device such as a personal digital assistant. An access terminal can also be called a subscriber station, subscriber unit, mobile station, wireless device, mobile, remote station, remote terminal, user terminal, user agent, or user equipment. A subscriber station may be a cellular telephone, PCS telephone, a cordless telephone, a Session Initiation Protocol (SIP) phone, a wireless local loop (WLL) station, a personal digital assistant (PDA), a handheld device having wireless connection capability, or other processing device connected to a wireless modem.

An "access point" refers to a device in an access network that communicates over the air-interface, through one or more sectors, with the access terminals or other access points. The access point acts as a router between the access terminal and the rest of the access network, which may include an IP network, by converting received air-interface frames to IP packets. Access points also coordinate the management of attributes for the air interface. An access point may be a base station, sectors of a base station, and/or a combination of a base transceiver station (BTS) and a base station controller (BSC).

Upon receipt of ACKs, data is transmitted 316 from the access point 308 to access terminal 304. In response to successful data transmissions, access terminal 304 responds with an ACK 320 to the access point 308. In response to receiving an ACK, the access point 308 then transmits the next data packet of interest 324 to the access terminal 304. If access terminal 304 did not properly decode the data 1A transmitted, a NACK message 328 is sent. However, due to channel degradation, an error 332 may occur such that the NACK message 328 is actually interpreted to be an ACK message 336 as received by access point 308.

Access point 308, assuming the access terminal 304 properly decoded data packet 1A (as illustrated by step 324), transmits data (340) to access terminal 304. Access terminal 304, by virtue of sending NACK 328, is expecting a retransmission of data 1B, the next set of incremental redundancy bits for data 1A (324), but instead receives data 2A (340). This causes the access terminal 304 to become out of sync with access point 308. When the access terminal 304 and access point 308 become out of sync, then various recovery mechanisms are needed to get the access terminal 304 and access point 308 back into synchronization. This process is cumbersome and usually results in many data packets being lost. In any event, this situation is one to be avoided.

Figure 4:
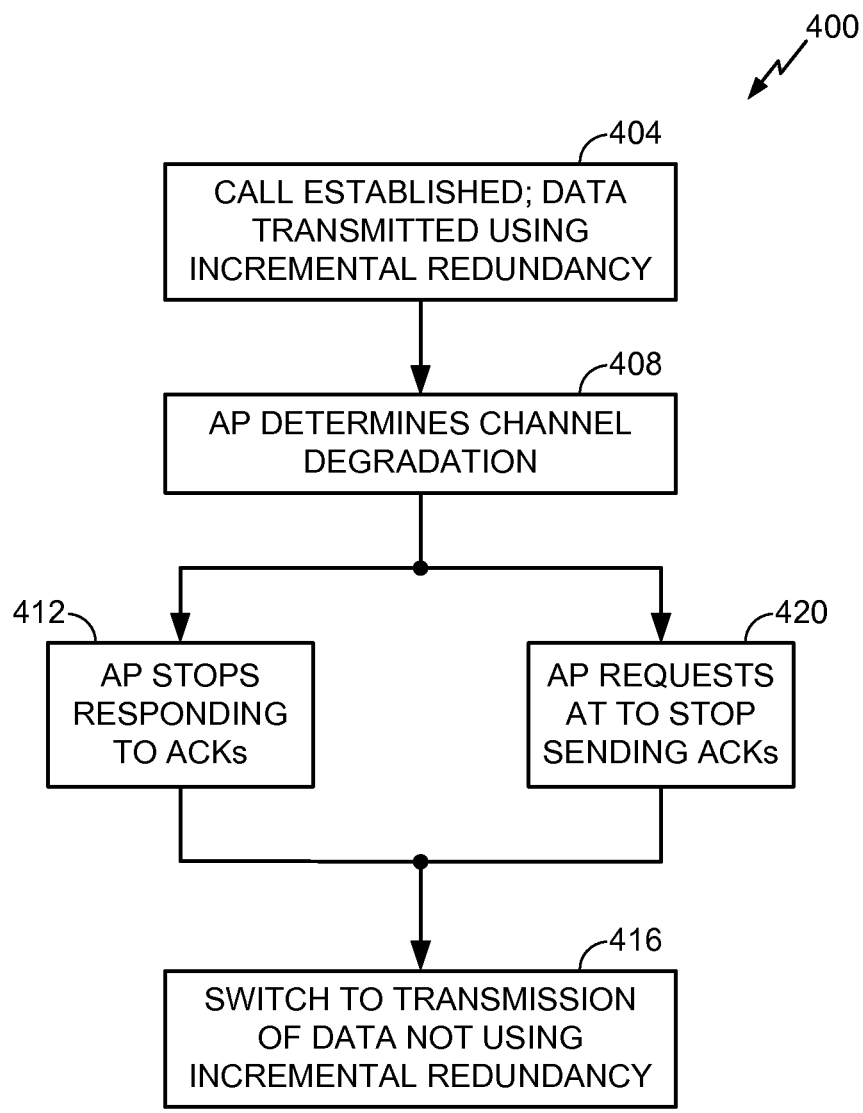
FIG. 4 illustrates a process to respond to recognition of channel degradation.

Accordingly, the embodiments discussed herein provide for mechanisms where to minimize situations in which the access point can become out of synchronization with the access terminal. Specifically, various ways are used to determine channel degradation such that NACK to ACK errors are avoided. FIG. 4 illustrates such a process 400 to respond to recognition of channel degradation. A call is established and various control data is transmitted 404 between the access terminal and access point. The access point then determines whether the channel has degraded 408.

The access point can determine this channel degradation in a variety of ways. For example, since there is a correlation between the reverse link performance and the NACK to ACK error rate, the access point is able to determine when the error rate is likely to be high. An example of reverse link performance measures include the reverse link control channel pilot or received power over noise. Another example is the measured error rates on the reverse link control channel when known control values are sent, which provides information to the access point to determine channel degradation. In another embodiment, the number of higher layer NACK messages, such as from the RLP layer, during a window of time indicating that the physical layer ACK'ed were not successfully received is used as a measure of channel degradation. Also, reverse link data channel error rates or reverse link reported power control parameters can give indications of access point to access terminal channel degradation.

In another embodiment, the filtered percentage of ACK erasures maybe used as a reverse link performance measurement. This is discussed in more detail below with respect to FIGS. 5 and 6.

Upon recognition of channel degradation, the access point may stop responding 412 to the ACK messages sent from the access terminal, and then switch 416 to transmission of data not using incremental redundancy. Alternatively, access point may request 420 the access terminal to stop sending ACK messages. This has the added benefit of minimizing noise in the system as viewed by one or more access points.

Figure 5:
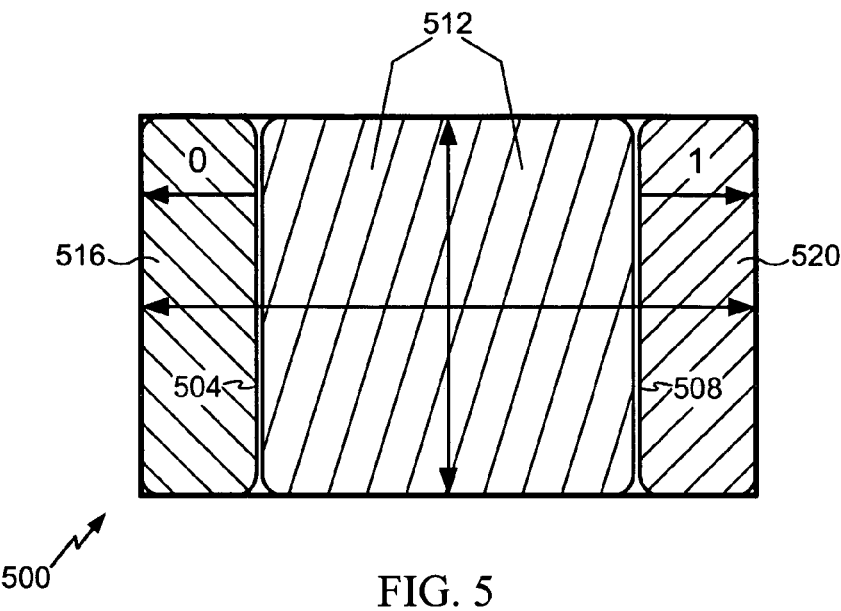
FIG. 5 illustrates a graph of erasure detection.

FIG. 5 illustrates the concept of erasure detection. Erasure detection is typically utilized in the ACK channel and can give the indication of channel degradation. Erasure detection involves the establishment of an erased region, defined by lines 504 and 508 in FIG. 5. Data bits received within the erased region 512 are indicative of a lack of confidence as to whether the bit sent is a "0" or a "1". If the bit received corresponds to being received in region 520, there is a high degree of confidence that the bit received is a "1". If the bit received corresponds to being received in region 516, there is a high degree of confidence that the bit received is a "0".

Figure 6:
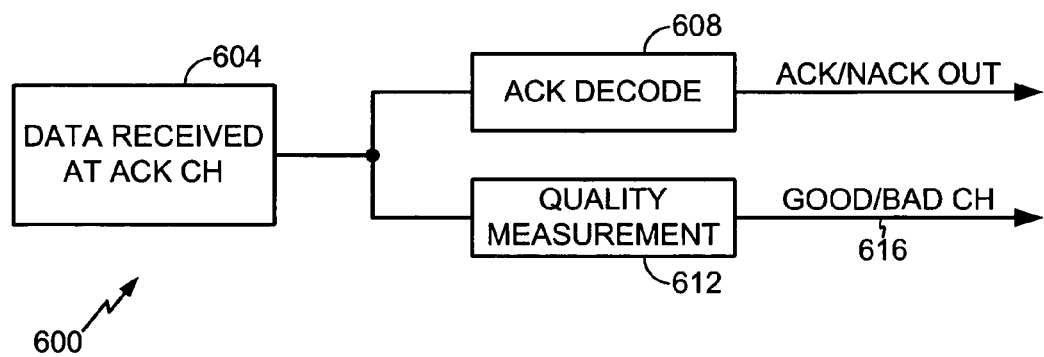
FIG. 6 illustrates using erasure detection in response to channel degradation.

This process is also described in FIG. 6, which illustrates using erasure detection in response to channel degradation 600. Data is received at the ACK channel 604. The data is sent both to an ACK decode element 608 and quality measurement element 612. The ACK decode element 608 attempts to decode whether the bit received is an ACK bit or a NACK bit, in accordance with the scheme illustrated in FIG. 5. More specifically, the ACK decode element 608 determines whether the bit received is in region 520, and therefore in fact an ACK bit, or not an ACK bit, and therefore is either in the erased region 512 or in the NACK region 516.

The data received on the ACK channel is also sent to the quality measurement element 612. The quality measurement element 612 considers the filtered percentage of erasures over time. If the filtered percentage of erasures is above or low a certain threshold, quality measurement element 612 declares whether the ACK channel is good or bad 616. Thus, quality measurement element 612 distinguishes between a bit received in region 520 (a "1"), region 516 (a "0"), or in the erased region 512. If the bit received is in region 516 or 520, there is a high degree of confidence that the bit received is a true reading. Accordingly, quality measurement element 612 can emit a "good channel" indicator. Conversely, if there is a lower level of confidence that the bit received is a true reading. Accordingly, quality measurement element 612 can emit a "bad channel" indicator.

The various aspects and features of the present invention have been described above with regard to specific embodiments. As used herein, the terms 'comprises,' 'comprising,' or any other variations thereof, are intended to be interpreted as non-exclusively including the elements or limitations which follow those terms. Accordingly, a system, method, or other embodiment that comprises a set of elements is not limited to only those elements, and may include other elements not expressly listed or inherent to the claimed embodiment.

As examples, the various illustrative logical blocks, flowcharts, windows, and steps described in connection with the embodiments disclosed herein may be implemented or performed in hardware or software with an application-specific integrated circuit (ASIC), a programmable logic device, discrete gate or transistor logic, discrete hardware components, such as, e.g., registers and FIFO, a processor executing a set of firmware instructions, any conventional programmable software and a processor, or any combination thereof. The processor may advantageously be a microprocessor, but in the alternative, the processor may be any conventional processor, controller, microcontroller, or state machine. The software could reside in RAM memory, flash memory, ROM memory, registers, hard disk, a removable disk, or any other form of storage medium known in the art.

While the present invention has been described with reference to particular embodiments, it should be understood that the embodiments are illustrative and that the scope of the invention is not limited to these embodiments. Many variations, modifications, additions and improvements to the embodiments described above are possible. It is contemplated that these variations, modifications, additions and improvements fall within the scope of the invention as detailed within the following claims.

What is claimed is:

1. A method for transmission of information in a multiple access communication system, the method comprising:
   transmitting information on a forward link using incremental redundancy;
   determining if reverse-link performance drops below a predetermined threshold, the predetermined threshold being used to determine channel degradation on a reverse link; and
   determining whether to respond to messages received on the reverse link for the information transmitted on the forward link if the reverse-link performance drops below the predetermined threshold.

2. The method set forth in claim 1, further comprising transmitting information without using incremental redundancy if the reverse-link performance drops below the predetermined threshold.

3. The method set forth in claim 1 wherein the act of determining if reverse-link performance drops below a predetermined threshold further comprises determining whether a NACK to ACK error rate exceeds the predetermined threshold.

4. The method set forth in claim 1, wherein the act of determining if reverse-link performance drops below a predetermined threshold further comprises determining whether reverse link data channel error rates exceed the predetermined threshold.

5. The method set forth in claim 1, wherein the act of determining if reverse-link performance drops below a predetermined threshold further comprises comparing a filtered percentage of ACK erasures against the predetermined threshold.

6. The method set forth in claim 1, further comprising sending a retransmission of data upon determination that a message received is reliably a NACK.

7. The method set forth in claim 1, further comprising ignoring a received ACK or NACK message if the reverse-link performance drops below the predetermined threshold.

8. The method set forth in claim 1, further comprising sending a message on the forward link to cease transmission of ACK and/or NACK messages on the reverse link.

9. The method set forth in claim 1, wherein the act of transmitting further comprises transmitting in accordance with a Frequency Division Multiplex (FDM) scheme.

10. The method set forth in claim 1, wherein the act of transmitting further comprises transmitting in accordance with a Code Division Multiplex (CDM) scheme.

11. The method set forth in claim 1, wherein the act of transmitting further comprises transmitting in accordance with an Orthogonal Frequency Division Multiplex (OFDM) scheme.

12. The method set forth in claim 1, wherein the act of transmitting further comprises transmitting in accordance with an Orthogonal Frequency Division Multiple Access (OFDMA) scheme.

13. The method of claim 1 wherein the act of transmitting information using incremental redundancy further comprises transmitting in accordance with an Automatic Repeat Request (ARQ) protocol.

14. In a wireless communication system, a method of determining whether a communication channel has degraded, the method comprising:
    receiving a message indicative of an acknowledgment (ACK) or indicative of a not-acknowledgment (HACK) via the communication channel;
    measuring quality of the received message; and
    determining whether the communication channel has degraded as a function of the measured quality of the received message.

15. The method set forth in claim 14, wherein the act of determining comprises determining a filtered percentage of erasures of messages received via the communication channel over a predetermined amount of time.

16. The method set forth in claim 14, further comprising sending a retransmission of data upon determination that the received message is reliably a NACK.

17. The method set forth in claim 14, wherein the act of receiving comprises receiving the message in accordance with a Frequency Division Multiplex (FDM) scheme.

18. The method set forth in claim 14, wherein the act of receiving comprises receiving the message in accordance with a Code Division Multiplex (CDM) scheme.

19. The method set forth in claim 14, wherein the act of receiving comprises receiving the message in accordance with an Orthogonal Frequency Division Multiplex (OFDM) scheme.

20. The method set forth in claim 14, wherein the act of receiving comprises receiving the message in accordance with an Orthogonal Frequency Division Multiple Access (OFDMA) scheme.

21. An apparatus for transmission of information in a multiple access communication system, the apparatus comprising:
    means for transmitting information on a forward link using incremental redundancy;
    means for determining if reverse-link performance drops below a predetermined threshold, the predetermined threshold being used to determine channel degradation on a reverse link; and
    means for determining whether to respond to messages received on the reverse link for the information transmitted on the forward link if the reverse-link performance drops below the predetermined threshold.

22. The apparatus set forth in claim 21, further comprising means for transmitting information without using incremental redundancy if the reverse-link performance drops below the predetermined threshold.

23. The apparatus set forth in claim 21, wherein the means for determining if reverse-link performance drops below a predetermined threshold further comprises means for determining whether a NACK to ACK error rate exceed the predetermined threshold.

24. The apparatus set forth in claim 21, wherein the means for determining if reverse-link performance drops below a predetermined threshold further comprises means for determining whether reverse link data channel error rates exceed the predetermined threshold.

25. The apparatus set forth in claim 21, further comprising means for sending a retransmission of data upon determination that a message received is reliably a NACK.

26. The apparatus set forth in claim 21, wherein the means for determining if reverse-link performance drops below a predetermined threshold further comprises means for comparing a filtered percentage of ACK erasures against the predetermined threshold.

27. The apparatus set forth in claim 21, further comprising
means for ignoring a received ACK or NACK message if the reverse-link performance drops below the predetermined threshold.

28. The apparatus set forth in claim 21, further comprising
means for sending a message on the forward link to cease transmission of ACK messages on the reverse link.

29. The apparatus of claim 21 further comprising
means for determining whether to transmit a new packet of information or retransmit a previous packet of information, based on an acknowledgement of a previous transmission.

30. The apparatus set forth in claim 21, wherein the means for transmitting further comprises means for transmitting in accordance with a Frequency Division Multiplex (FDM) scheme.

31. The apparatus set forth in claim 21, wherein the means for transmitting further comprises means for transmitting in accordance with a Code Division Multiplex (CDM) scheme.

32. The apparatus set forth in claim 21, wherein the means for transmitting further comprises means for transmitting in accordance with an Orthogonal Frequency Division Multiplex (OFDM) scheme.

33. The apparatus set forth in claim 21, wherein the means for transmitting further comprises means for transmitting in accordance with an Orthogonal Frequency Division Multiple Access (OFDMA) scheme.

34. The apparatus of claim 21 wherein the means for transmitting information using incremental redundancy further comprises means for transmitting in accordance with an Automatic Repeat Request (ARQ) protocol.

35. In a wireless communication system, an apparatus to determine whether a communication channel has degraded, the apparatus comprising:
means for receiving a message indicative of an acknowledgment (ACK) or indicative of a not-acknowledgment (NACK) via the communication channel;
means for measuring quality of the received message; and
means for determining whether the communication channel has degraded as a function of the measured quality of the received message.

36. The apparatus set forth in claim 35, wherein the means for determining comprises means for determining a filtered percentage of erasures of messages received via the communication channel over a predetermined amount of time.

37. The apparatus set forth in claim 35, further comprising
means for sending a retransmission of data upon determination that the received message is reliably a NACK.

38. The apparatus set forth in claim 35, wherein the means for receiving comprises means for receiving the message in accordance with a Frequency Division Multiplex (FDM) scheme.

39. The apparatus set forth in claim 35, wherein the means for receiving comprises means for receiving the message in accordance with a Code Division Multiplex (CDM) scheme.

40. The apparatus set forth in claim 35, wherein the means for receiving comprises means for receiving the message in accordance with an Orthogonal Frequency Division Multiplex (OFDM) scheme.

41. The apparatus set forth in claim 35, wherein the means for receiving comprises means for receiving the message in accordance with an Orthogonal Frequency Division Multiple Access (OFDMA) scheme.

42. In a wireless communication system, an apparatus comprising:
a receiver configured to receive a message indicative of an acknowledgment (ACK) or indicative of a not-acknowledgment (NACK) via a communication channel; and
a quality measurement element coupled to the receiver and configured to measure quality of the received message and to determine whether the communication channel has degraded as a function of the measured quality of the received message.

43. The apparatus set forth in claim 42, wherein the quality measurement element further comprises an element to determine a filtered percentage of erasures of messages received via the communication channel over a predetermined amount of time.

44. The apparatus set forth in claim 42, further comprising
a transmitter configured to transmit a retransmission of data upon determination that the received message is reliably a NACK.

45. A machine-readable medium comprising instructions which, when executed by a machine, cause the machine to perform operations including:
transmitting information on a forward link using incremental redundancy;
determining if reverse-link performance drops below a predetermined threshold, the predetermined threshold being used to determine channel degradation on a reverse link; and
determining whether to respond to messages received on the reverse link for the information transmitted on the forward link if the reverse-link performance drops below the predetermined threshold.

46. The machine-readable medium of claim 45, further comprising machine readable instructions to cause the machine to transmit information without using incremental redundancy if the reverse-link performance drops below the predetermined threshold.

47. The machine-readable medium of claim 45, further comprising machine readable instructions to cause the machine to determine whether a NACK to ACK error rate exceed the predetermined threshold.

48. An apparatus for transmission of information in a multiple access communication system, the apparatus comprising:
a transmitter configured to transmit information on a forward link using incremental redundancy; and
a processor configured to determine if reverse-link performance drops below a predetermined threshold, the predetermined threshold being used to determine channel degradation on a reverse link; and to determine whether to respond to messages received on the reverse link for the information transmitted on the forward link if the reverse-link performance drops below the predetermined threshold.

49. The apparatus set forth in claim 48, wherein the transmitter is further configured to transmit information without using incremental redundancy if the reverse-link performance drops below the predetermined threshold.

50. The apparatus set forth in claim 48, wherein the processor is further configured to determine whether a NACK to ACK error rate exceeds the predetermined threshold.

51. The apparatus set forth in claim 48, wherein the processor is further configured to determine whether reverse link data channel error rates exceed the predetermined threshold.

52. The apparatus set forth in claim 48, wherein the processor is further configured to compare a filtered percentage of ACK erasures against the predetermined threshold.

53. The apparatus set forth in claim 48, wherein the transmitter is further configured to retransmit data upon determination that a message received is reliably a NACK.

54. The method set forth in claim 1, wherein the act of determining whether to respond to messages received on the reverse link comprises determining whether to ignore messages received on the reverse link to cease transmission.

55. The method set forth in claim 54, further comprising:
ignoring messages received on the reverse link to cease transmission if the reverse-link performance drops below the predetermined threshold.

* * * * *